United States Patent
Um et al.

(10) Patent No.: US 6,751,383 B2
(45) Date of Patent: Jun. 15, 2004

(54) LOOSE TUBE OPTICAL RIBBON CABLE

(75) Inventors: Eun-Song Um, Kumi (KR); Joong-Jin Hwang, Kumi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/235,164

(22) Filed: Sep. 5, 2002

(65) Prior Publication Data

US 2003/0202757 A1 Oct. 30, 2003

(30) Foreign Application Priority Data

Apr. 30, 2002 (KR) ........................................ 2002-23829

(51) Int. Cl.[7] ................................................ G02B 6/44
(52) U.S. Cl. ...................................................... 385/112
(58) Field of Search .................................. 385/105, 109, 385/110, 112, 113, 114

(56) References Cited

U.S. PATENT DOCUMENTS

| | | | | |
|---|---|---|---|---|
| 5,229,851 A | * | 7/1993 | Rahman | 385/114 |
| 5,389,442 A | * | 2/1995 | Arroyo et al. | 428/396 |
| 5,621,841 A | * | 4/1997 | Field | 385/113 |
| 5,848,212 A | * | 12/1998 | Wagman | 3385/111 |
| 6,088,499 A | * | 7/2000 | Newton et al. | 385/112 |
| 6,185,351 B1 | * | 2/2001 | Daneshvar et al. | 385/114 |

* cited by examiner

Primary Examiner—Tulsidas C. Patel
(74) Attorney, Agent, or Firm—Cha & Reiter, L.L.C.

(57) ABSTRACT

The present invention relates to a loose-tube, optical-ribbon cable, which comprises a central tensile-strength component situated in the center of the optical-ribbon cable; a plurality of loose tubes mounted with a bundle of optical-ribbon fibers, wherein the bundle of optical-ribbon fibers are formed by laminating multiple optical-ribbon fibers, each optical-ribbon fiber including multiple cores of optical fibers stranded in a single row and a sheath surrounding the multiple cores of optical fibers, wherein the plurality of loose tubes are stranded around the central tensile-strength component; a plurality of circle-shaped, water-absorbing members arranged in a hollow which is formed outside the pair of loose tubes neighboring each other; a water-absorbing tape for surrounding the plurality of loose tubes and plurality of circle-shaped, water-absorbing members; and, an external sheath situated in the outermost surface of the optical ribbon-cable for protecting the interior of the loose tube optical-ribbon cable against the external environment.

7 Claims, 4 Drawing Sheets

LOOSE TUBE OPTICAL RIBBON CABLE

CLAIM OF PRIORITY

This application makes reference to and claims all benefits accruing under 35 U.S.C. Section 119 from an application entitled, "LOOSE TUBE OPTICAL RIBBON CABLE," filed in the Korean Industrial Property Office on Apr. 30, 2002 and there duly assigned Serial No. 2002-23829.

BACKGROUND OF THE INVENTION

1. Field of the Invention

The present invention relates to an optical-ribbon cable and more particularly to an optical-ribbon cable with loose tubes.

2. Description of the Related Art

Typically, optical-ribbon cables include optical-ribbon fibers as a transmission medium for optical signals. Optical-ribbon fibers are made of multiple cores of the optical fibers stranded in a single row and can be fabricated by stranding the multiple cores of the optical fibers in a single row, then sheathing them with UV-curable resin, followed by curing the UV-curable resin with UV. In addition, multiple optical-ribbon fibers can be laminated to compose a bundle of optical-ribbon fibers with a matrix structure. This type of optical-ribbon fibers has an advantage in that fiber density is very high in a limited space as multiple optical fibers are closely packed. As such, much attention is given to the use of high-density, optical-ribbon cables. The reason is that a large number of optical cables have been installed already in existing duct lines, so there is a shortage of space for the installation of new cables. Moreover, in view of efforts to reduce the outer diameters of optical cables or any increase in the packing density of optical fibers, the installation of such cables is ideal in the existing narrow ducts.

FIG. 1 is a cross-sectional view illustrating a configuration of a conventional loose-tube, optical-ribbon cable. The optical-ribbon cable comprises a central tensile-strength component 110, a number of bundles of optical-ribbon fibers 120, a plurality of loose tubes 130, a tensile-strength component 140, and an external sheath 150.

As shown in FIG. 1, the central tensile-strength component 110 provides tensile strength for the loose-tube, optical-ribbon cable, thus situated in the center thereof. The loose tubes 130 are mounted with a bundle of optical-ribbon fibers 120. The bundle of optical-ribbon fibers 120 has a matrix structure, where four or more cores of optical fibers are stranded in a single row and sheathed with UV-curable resin to form an optical-ribbon fiber, followed by lamination of multiple optical-ribbon fibers.

The tensile-strength component 140 surrounds the plurality of loose tubes 130 and performs a function of improving the tensile strength of the loose-tube, optical-ribbon cable. The external sheath 150 is formed using an extrusion process. The sheath comprises the outermost layer of the optical-ribbon cable so as to protect its interior against the external environment.

However, the above-described conventional loose-tube, optical-ribbon cable has drawbacks in that it has a poor resistance to moisture penetration and external stresses (pressure force, impact, etc). In addition, in terms of the physical appearance of the loose-tube, optical-ribbon cable, it is difficult to retain its original cross-sectional form because a hollow 160 is formed outside the pair of neighboring loose tubes 130.

SUMMARY OF THE INVENTION

Therefore, the present invention overcomes the above-described problems and provides additional advantages, by providing a loose-tube, optical-ribbon cable, having improved water resistance and compression properties as well as exhibiting a good appearance.

In accordance with the present invention, the loose-tube, optical-ribbon cable includes a central tensile-strength component situated in the center of the optical-ribbon cable; a plurality of loose tubes mounted with a bundle of optical-ribbon fibers, the bundle of optical-ribbon fibers being formed by laminating multiple optical-ribbon fibers, each optical-ribbon fiber including multiple cores of optical fibers stranded in a single row and a sheath surrounding the multiple cores of optical fibers, the plurality of loose tubes being stranded around the central tensile-strength component; a plurality of circle-shaped, water-absorbing members arranged in a hollow which is formed outside a pair of the loose tubes neighboring each other; a water absorbing tape for surrounding the plurality of loose tubes and the plurality of circle-shaped, water-absorbing members; and, an external sheath situated in the outermost surface of the optical-ribbon cable for protecting the interior of the loose-tube, optical-ribbon cable against the external environment.

BRIEF DESCRIPTION OF THE DRAWINGS

The above features and other advantages of the present invention will be more clearly understood from the following detailed description taken in conjunction with the accompanying drawings, in which.

DETAILED DESCRIPTION OF THE PREFERRED EMBODIMENTS

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 1:
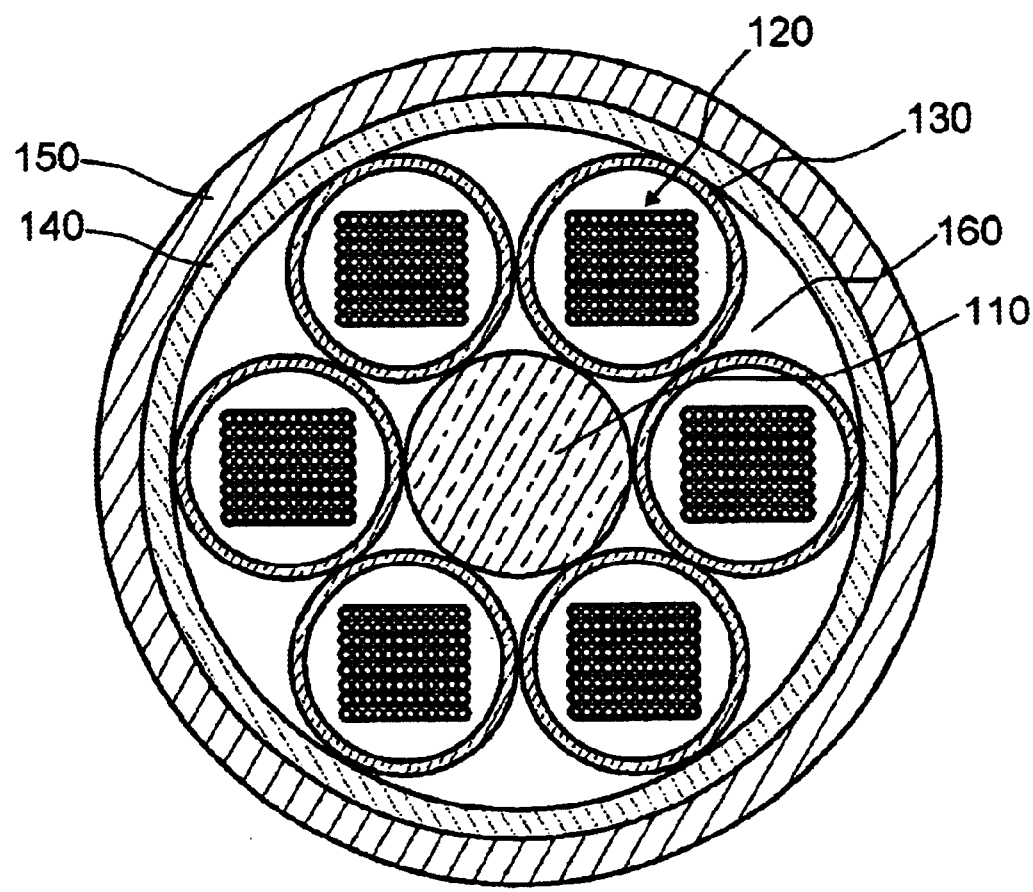
FIG. 1 is a cross-sectional view illustrating the configuration of a conventional loose-tube, optical-ribbon cable.
Figure 2:
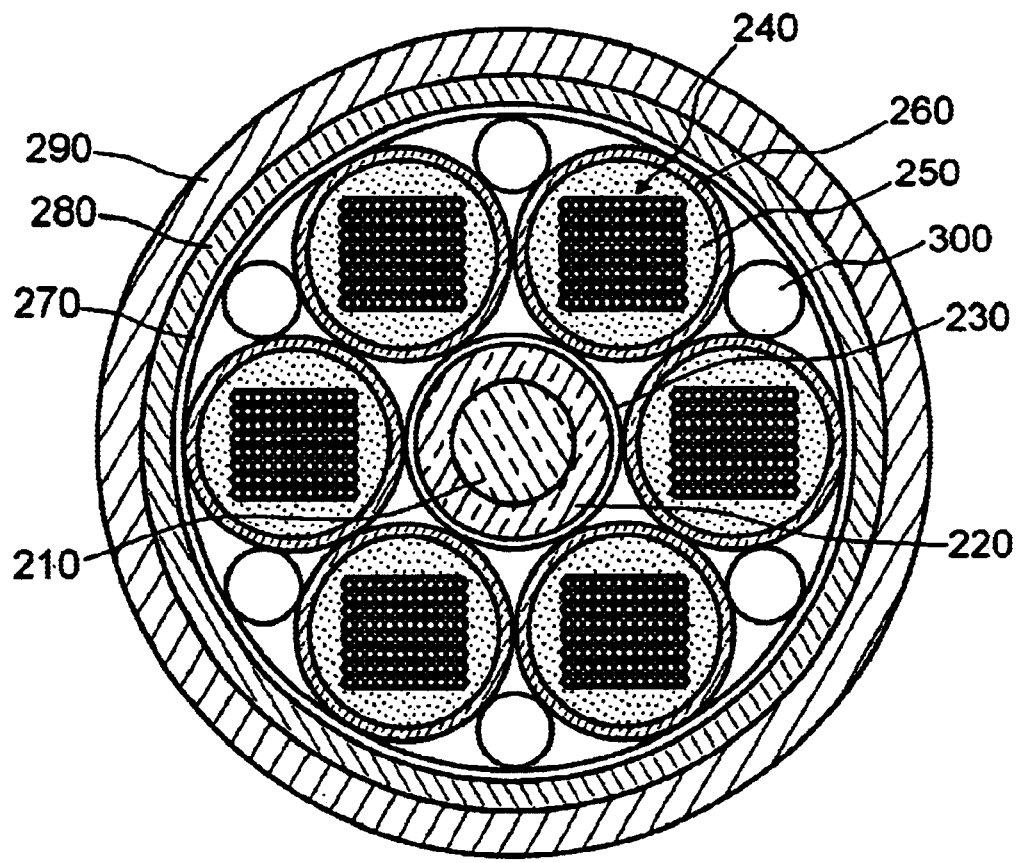
FIG. 2 is a cross-sectional view illustrating the configuration of a loose-tube, optical-ribbon cable in accordance with a preferred embodiment of the present invention.
Figure 3:
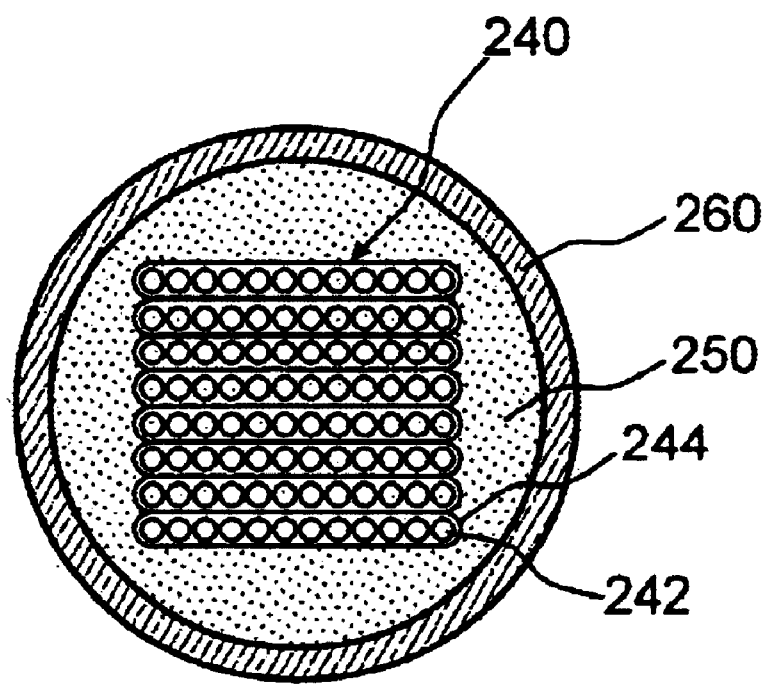
FIG. 3 is a cross-sectional view illustrating a loose tube illustrated in FIG. 2; and, FIG. 4 is a cross-sectional view illustrating a circle-shaped, water-absorbing member illustrated in FIG. 2.
Figure 4:
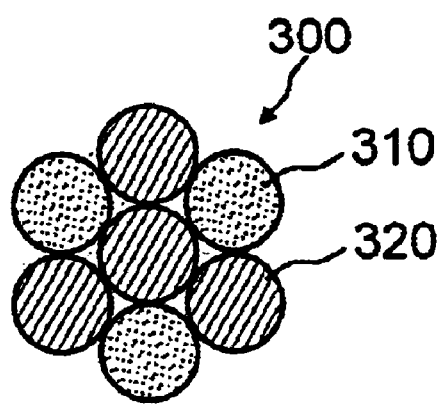

FIG. 2 is a cross-sectional view illustrating the configuration of a loose-tube, optical-ribbon cable in accordance with a preferred embodiment of the present invention. FIG. 3 is a cross-sectional view illustrating the loose tube illustrated in FIG. 2. FIG. 4 a cross-sectional view illustrating the circle-shaped, water-absorbing member illustrated in FIG. 2.

As shown in FIG. 2, the optical-ribbon cable comprises a central tensile-strength component 210, a plurality of loose tubes 160, a plurality of circle-shaped, water-absorbing members 300, a second water-absorbing tape 270, a tensile-strength component 280, and an external sheath 290.

The central tensile-strength component 210 provides tensile strength for the loose tube, optical-ribbon cable and is situated in the center thereof. As a material for the central tensile-strength component 210, fiberglass-reinforced plastic (FRP) is available. For the material of a layer 220 coated on the central tensile-strength component 210, a polymer compound such as polyvinyl chloride (PVC), polyethylene (PE), etc., is available. Furthermore, the coated central tensile-strength component 210 and 220 is wound with a first water-absorbing tape 230. The first water-absorbing tape 230 performs the function of absorbing moisture residing between the central tensile-strength component 210 and the plurality of loose tubes 260.

The loose tubes 260 are mounted with a bundle of optical-ribbon fibers 240. The bundle of optical-ribbon fibers 240 has a matrix structure, where four or more cores of optical fibers 242 are stranded in a single row and sheathed with UV-curable resin to form an optical-ribbon fiber, followed by lamination of multiple optical-ribbon fibers. In addition, a jelly compound 250 is packed in an empty space of the loose tubes 260 so as to protect the bundles of optical-ribbon fibers 240 from external impact and to perform the absorption of moisture penetrated into the loose tubes 260. The plurality of loose tubes 260 may be stranded around the central tensile-strength component 210, in a helical or S-Z pattern.

The circle-shaped, water-absorbing members 300 are arranged in a hollow formed outside a pair of neighboring loose tubes 260 and are water resistant. For these reasons, the water-absorbing members 300 absorb moisture residing between the second water absorbing tape 270 and the plurality of loose tubes 260. The circle-shaped, water-absorbing members 300 have a certain degree of strength so that they improve the compressibility of the optical-ribbon cable. Furthermore, the circle-shaped, water absorbing members 300 fill the hollow formed by the plurality of loose tubes 260, thereby enabling a cross-section of the optical-ribbon cable to be maintained in a circle shape. The circle-shaped, water-absorbing members 300 may include multiple water-absorbing yarns and strength yarns twisted together to form an overall circle.

Referring to FIG. 4, the circle-shaped, water-absorbing members 300 may include three cores of water-absorbing yarns 310, with each core absorbing moisture and being swelled, and four cores of strength yarns 320, with each core having a certain degree of strength, thereby maintaining the shape of the circle-shaped water-absorbing members. The three cores of water-absorbing yarns 310 and four cores of strength yarns 320 are twisted together, thus forming an overall circle. As for the strength yarns 320, aramid yarns or glass yarns are available.

With continued reference to FIG. 2, the second water-absorbing tape 270 surrounds the plurality of loose tubes 260 and the plurality of circle-shaped, water-absorbing member 300, thereby preventing the penetration of moisture into the interior thereof. The tensile-strength component 280 surrounds the second, water-absorbing tape 270, and performs the function of improving the tensile strength of the optical-ribbon cable. As the material for the tensile-strength component, aramid yarns or glass yarns are available. The external sheath 290 is situated at the outermost surface of the loose tube optical-ribbon cable. As the material for the external sheath 290, a polymer compound such as polyvinyl chloride (PVC), polyethylene (PE), hytrel, nylon, and polypropylene is available. The external sheath 290 is formed using an extrusion process. In addition, the external sheath 290 may be mounted with a rip cord (not illustrated) adjacent to the inside thereof for convenience upon removal thereof.

As apparent from the above description, the loose-tube, optical-ribbon cable according to the present invention employs circle-shaped, water-absorbing members, so having the advantages of improved water resistance and compression properties, and having an improved appearance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A loose tube, optical-ribbon cable comprising:

a central tensile-strength component situated in the center of the optical-ribbon cable;

a plurality of loose tubes having a bundle of optical-ribbon fibers surrounding the central tensile-strength component and disposed in parallel arrangement, one to each other, the bundle of optical-ribbon fibers being formed by laminating the optical-ribbon fibers, each optical-ribbon fiber including multiple cores of optical fibers stranded in a single row and a sheath surrounding the multiple cores of optical fibers;

a plurality of circle-shaped, water-absorbing members disposed in hollows between the plurality of tubes, the members comprising a plurality of twisted yarns, some of which are water-absorbing, and a remainder of which have a certain degree of strength, each water-absorbing member comprising a predetermined number of each type of yarn that are both twisted together to maintain a shape of the circle-shaped, water-absorbing members;

a water-absorbing tape for surrounding the plurality of loose tubes and the plurality of circle-shaped, water-absorbing members; and, an external sheath forming an outermost layer of the optical-ribbon cable, for protecting an interior of the loose tube, optical-ribbon cable against an external environment.

2. The loose-tube, optical-ribbon cable as set forth in claim 1, further comprising a tensile-strength component situated between the water-absorbing tape and the external sheath to enhance tensile strength thereof.

3. The loose tube, optical-ribbon cable as set forth in claim 1, further comprising a tensile-strength component situated between the water-absorbing tape and the external sheath to enhance tensile strength thereof.

4. The loose-tube, optical-ribbon cable as set forth in claim 1, wherein the central tensile-strength component is defined by fiberglass-reinforced plastic (FRP) material.

5. The loose-tube, optical-ribbon cable as set forth in claim 1, wherein an outer layer of the central tensile-strength component is defined by a polymer, polyvinyl chloride (PVC), and polyethylene (PE) compound.

6. The loose-tube, optical-ribbon cable as set forth in claim 1, wherein the external sheath is defined by a polymer, polyvinyl chloride (PVC), polyethylene (PE), hytrel, nylon, and polypropylene material.

7. The loose-tube, optical-ribbon cable as set forth in claim 1, wherein the external sheath is formed using an extrusion technique.

\* \* \* \* \*